United States Patent
Liang et al.

(10) Patent No.: US 9,441,577 B2
(45) Date of Patent: Sep. 13, 2016

(54) PRESSURE REDUCING SYSTEM FOR FUEL GAS AND NATURAL GAS DEWAXING VEHICLE

(75) Inventors: Dequan Liang, Henan (CN); Weizhong Wang, Henan (CN); Xiangfu Dai, Henan (CN); Nian Li, Henan (CN); Xingpu Wang, Henan (CN); Peng Li, Henan (CN); Shucheng Lu, Henan (CN); Yuqiong Luo, Henan (CN); Zhangying Li, Henan (CN); Jinsong Tan, Henan (CN); Dan Wu, Henan (CN); Sen Lin, Henan (CN)

(73) Assignee: ZYT PETROLEUM EQUIPMENT CO., LTD., Puyang, Henan (CN)

(*) Notice: Subject to any disclaimer, the term of this patent is extended or adjusted under 35 U.S.C. 154(b) by 1230 days.

(21) Appl. No.: 13/389,795

(22) PCT Filed: Aug. 11, 2010

(86) PCT No.: PCT/CN2010/075903
§ 371 (c)(1),
(2), (4) Date: Feb. 9, 2012

(87) PCT Pub. No.: WO2011/018036
PCT Pub. Date: Feb. 17, 2011

(65) Prior Publication Data
US 2012/0138182 A1  Jun. 7, 2012

(30) Foreign Application Priority Data
Aug. 12, 2009  (CN) .......................... 2009 1 0065745

(51) Int. Cl.
*F02M 21/06* (2006.01)
*B60P 3/22* (2006.01)
*G05D 16/20* (2006.01)

(52) U.S. Cl.
CPC .............. *F02M 21/06* (2013.01); *B60P 3/225* (2013.01); *G05D 16/2033* (2013.01); *Y02T 10/32* (2013.01);

(Continued)

(58) Field of Classification Search
CPC ........................... B60P 3/225; G05D 16/2033
USPC .................. 137/334, 614, 572, 899; 239/172
See application file for complete search history.

(56) References Cited

U.S. PATENT DOCUMENTS 3,533,395 A * 10/1970 Yaste .................... B64F 5/0054
126/271.1
4,191,348 A * 3/1980 Holwerda ............. B64F 5/0054
126/271.1

(Continued)

FOREIGN PATENT DOCUMENTS

| CA | 2393302 | 1/2004 |
| CN | 2321947 | 6/1999 |

(Continued)

OTHER PUBLICATIONS

PCT/CN2010/075903, Nov. 25, 2010, English Translation of International Search Report.

*Primary Examiner* — John K Fristoe, Jr.
*Assistant Examiner* — Christopher Ballman
(74) *Attorney, Agent, or Firm* — Workman Nydegger

(57) ABSTRACT

A pressure reducing system for fuel gas and a natural gas dewaxing vehicle are provided. The pressure reducing system includes fuel gas pipelines which consist of successively connected a high pressure pipeline, a medium pressure pipeline and a low pressure pipeline in the flow direction of fuel gas. The tail end of the low pressure pipeline connects with a combustion apparatus. A high pressure relief valve, a high pressure air feed valve, a heat exchanger and a primary pressure reducing valve subassembly are connected on the high pressure pipeline. The heat exchanger is provided with a hot fluid inlet and a hot fluid outlet, where the hot fluid inlet connects with a hot water apparatus, and the hot fluid outlet connects with a water storage apparatus. The medium pressure pipeline is equipped with a medium pressure relief valve and a secondary pressure reducing valve.

7 Claims, 2 Drawing Sheets

(52) U.S. Cl.
CPC ..... *Y10T 137/6855* (2015.04); *Y10T 137/7761* (2015.04); *Y10T 137/86196* (2015.04); *Y10T 137/86292* (2015.04); *Y10T 137/87925* (2015.04)

(56) References Cited

U.S. PATENT DOCUMENTS

| | | | | |
|---|---|---|---|---|
| 4,333,607 | A * | 6/1982 | Mueller | B64F 5/0063 239/13 |
| 4,565,321 | A * | 1/1986 | Vestergaard | A62C 27/00 239/172 |
| 4,826,107 | A * | 5/1989 | Thornton-Trump | B64F 5/0063 122/408.1 |
| 5,028,017 | A * | 7/1991 | Simmons et al. | 244/134 C |
| 5,090,207 | A * | 2/1992 | Gilbertson et al. | 62/59 |
| 5,242,133 | A * | 9/1993 | Zwick | B01F 3/088 222/146.2 |
| 5,411,058 | A * | 5/1995 | Welsh et al. | 137/572 |
| 5,595,344 | A * | 1/1997 | Starnes | A61B 19/34 239/307 |
| 5,656,136 | A * | 8/1997 | Gayaut et al. | 166/302 |
| 6,241,953 | B1 * | 6/2001 | Krijgsman | 422/208 |
| 6,820,841 | B2 * | 11/2004 | Mittereder | B64F 5/0054 244/134 C |
| 6,883,726 | B2 * | 4/2005 | Polk | B05B 9/06 239/1 |
| 7,530,403 | B2 * | 5/2009 | Cano | 169/24 |
| 2003/0192609 | A1 * | 10/2003 | Enerson | 137/899 |
| 2007/0017575 | A1 * | 1/2007 | Hall et al. | 137/247 |

FOREIGN PATENT DOCUMENTS

| | | |
|---|---|---|
| CN | 2341992 Y | 10/1999 |
| CN | 2367778 | 3/2000 |
| CN | 2382918 | 6/2000 |
| CN | 2529177 | 1/2003 |
| CN | 2596004 | 12/2003 |
| CN | 2789601 Y | 6/2006 |
| CN | 201025163 | 2/2008 |
| CN | 201277009 | 7/2009 |
| CN | 101628546 | 1/2010 |
| CN | 201546841 | 8/2010 |

\* cited by examiner

PRESSURE REDUCING SYSTEM FOR FUEL GAS AND NATURAL GAS DEWAXING VEHICLE

The present application is the national phase of International Application No. PCT/CN2010/075903, titled "PRESSURE REDUCING SYSTEM FOR FUEL GAS AND NATURAL GAS DEWAXING VEHICLE", filed on Aug. 11, 2010, which claims the benefit of priority to Chinese patent application No. 200910065745.5 titled "PRESSURE REDUCING SYSTEM FOR FUEL GAS AND NATURAL GAS DEWAXING VEHICLE", filed with the Chinese State Intellectual Property Office on Aug. 12, 2009. The entire disclosure thereof is incorporated herein by reference.

TECHNICAL FIELD OF THE INVENTION

The present disclosure relates to a fuel gas pressure reducing system and a natural gas dewaxing vehicle employing the fuel gas pressure reducing system.

BACKGROUND OF THE INVENTION

The existing dewaxing vehicles in the market use the light diesel as fuel, which is relatively expensive and thus causes a relatively high use cost of the dewaxing vehicle. A Chinese patent application publication No. CN2596004 discloses a well-washing and dewaxing vehicle which can use the compressed natural gas as fuel to reduce the use cost of the dewaxing vehicle. However, when using the compressed natural gas, the compressed natural gas, due to relatively high pressure thereof, cannot directly satisfy the using requirements of the dewaxing vehicle, and thus the application of the dewaxing vehicle is limited. If using uncompressed natural gas, it is undoubted that the use cost of the dewaxing vehicle will be increased and thus the dewaxing vehicle is not applicable in practice.

SUMMARY OF THE INVENTION

The object of the present application is to provide a fuel gas pressure reducing system for reducing the pressure of the high pressure natural gas such that the pressure of the high pressure natural gas may meet the combustion condition.

For realizing the above objection, the fuel gas pressure reducing system provided by the present application includes a fuel gas pipeline, wherein along a flow direction of the fuel gas, the fuel gas pipeline includes a high pressure pipeline, a medium pressure pipeline and a low pressure pipeline which are successively connected. A tail end of the low pressure pipeline is connected to a combustion device, and a beginning end of the high pressure pipeline is connected to a gas storage device. The high pressure pipeline is provided therein with a high pressure relief valve, a high pressure gas supply valve, a heat exchanger and a first stage pressure reducing valve assembly. A hot fluid inlet of the heat exchanger is connected to a hot water device, and a hot fluid outlet of the heat exchanger is connected to a water storage device. The medium pressure pipeline is provided therein with a medium pressure relief valve and a second stage pressure reducing valve. The low pressure pipeline is provided therein with a low pressure relief valve and a third stage pressure reducing valve.

Due to the three-stage pressure reducing configuration, the fuel gas pressure reducing system provided by the present application may use the compressed natural gas as fuel safely, and may output the natural gas whose pressure meets the combustion requirements; at the same time, the fuel gas pressure reducing system provided by the present application does not need a large size gas storage device and may use the compressed natural gas without increasing the size of the vehicle, which reduces the use cost and the modification cost of the natural gas dewaxing vehicle. The heat exchanger provided in the high pressure pipeline may heat the fuel gas before reducing the pressure of the fuel gas, which ensures that the fuel gas pressure reducing system may output the natural gas whose temperature meets the predetermined requirements. In additional, the fuel gas pressure reducing system provided by the present application has a simple and compact structure and is easy to use, is highly applicable for using in the dewaxing vehicle.

As an improvement of the present application, a tail section of the low pressure pipeline is further connected to a combined solenoid valve assembly in series, and the combined solenoid valve assembly includes an overpressure cut-off solenoid valve and a flow regulating solenoid valve connected in series. Since the combined solenoid valve assembly includes the overpressure cut-off solenoid valve and the flow regulating solenoid valve connected in series, when the output pressure fluctuates and is greater than a predetermined safe pressure value, the overpressure cut-off solenoid valve will automatically cut off the pipeline to stop outputting the natural gas so as to avoid accidents. The flow regulating solenoid valve may adjust an output quantity of the natural gas in a unit time as required so as to satisfy the normal operating requirements of the combustion device under different conditions.

As a further improvement of the present application, the first stage pressure reducing valve assembly is provided with two pressure reducing valves connected in parallel, and it is provided in series a cut-off valve upstream and downstream of each of the pressure reducing valves, respectively.

It is provided in series a cut-off valve in the pipeline upstream and downstream of each of the pressure reducing valves respectively, such that gas paths passing through corresponding pressure reducing valve may be cut off by the cut-off valves so as to facilitating the routine adjustment and maintenance of the corresponding pressure reducing valve. Two pressure reducing valves are connected in parallel such that when one of the pressure reducing valves is adjusted, the other one of the pressure reducing valves may continue working.

As a further improvement of the present application, along the flow direction of the fuel gas, the medium pressure pipeline upstream of the medium pressure relief valve is provided therein with a blow-off valve.

The blow-off valve is provided to facilitate the discharging of the routine residual fuel gas in the fuel gas pipeline after the pressure reducing.

As a further improvement of the present application, along the flow direction of the fuel gas, the high pressure pipeline downstream of the high pressure relief valve is provided with a tee joint, and three gas ports of the tee joint are respectively connected to the gas storage device, the high pressure gas supply valve and a gas charging valve. A cut-off valve is connected between the gas charging valve and the tee joint in series. The high pressure pipeline between the tee joint and the high pressure gas supply valve is provided therein with a high pressure manometer. The high pressure pipeline between the high pressure gas supply valve and the heat exchanger is provided therein with a high pressure shut-off valve and a filter connected in series. The medium pressure pipeline between the medium pressure relief valve and the second stage pressure reducing valve is provided therein with a medium pressure manometer. The low pressure pipeline upstream of the low pressure relief valve is provided therein with a low pressure manometer. The low pressure pipeline between the low pressure relief valve and the third stage pressure reducing valve is provided therein with a low pressure gas supply valve and a flowmeter in series.

The tee joint is provided to facilitate the connection between the high pressure pipeline and the external gas storage device and the charging of the gas into the gas storage device via the gas charging valve. The cut-off valve may prevent the airflow from flowing back through the gas charging valve when the fuel gas pressure reducing system is in normal operation. The high pressure manometer, the medium pressure manometer and the low pressure manometer are provided to facilitate the monitoring of the pressure values of pipeline sections by the operator in operation. The filter may filter out impurities in the natural gas to ensure that the natural gas entering into the heat exchanger and supplied to the combustion device is purer and cleaner. The monometer is provided to facilitate the monitoring of the natural gas output quantity from the fuel gas pressure reducing system by the operator.

Another object of the present application is to provide a natural gas dewaxing vehicle employing the above fuel gas pressure reducing system. The natural gas dewaxing vehicle includes a vehicle chassis provided thereon with a bedplate on which a water supply system, a power mechanism, a combustion mechanism, a gas storage device and a fuel gas pressure reducing system connected to the gas storage device are provided. Along the flow direction of water, the water supply system includes a water tank, a water pump, a hot water device and a heat exchanger, which are successively connected via a water pipeline system, and discharged water of the heat exchanger flows back into the water tank. The combustion mechanism includes an air blower connected to a natural gas combustion device via an air outlet pipe, the natural gas combustion device is provided to heat the hot water device. The power mechanism includes a power device, and the power device is connected to the air blower and the water pump and provides power to the air blower and the water pump. Along the flow direction of natural gas, a gas supply system includes the gas storage device and the fuel gas pressure reducing system, and the fuel gas pressure reducing system includes a fuel gas pipeline. Along the flow direction of the fuel gas, the fuel gas pipeline includes a high pressure pipeline, a medium pressure pipeline and a low pressure pipeline which are successively connected. A tail end of the low pressure pipeline is connected to the natural gas combustion device, and a beginning end of the high pressure pipeline is connected to the gas storage device. The high pressure pipeline is provided therein with a high pressure relief valve, a high pressure gas supply valve, a heat exchanger and a first stage pressure reducing valve assembly. A hot fluid inlet of the heat exchanger is connected to the hot water device, and a hot fluid outlet of the heat exchanger is connected to the water tank. The medium pressure pipeline is provided therein with a medium pressure relief valve and a second stage pressure reducing valve, the low pressure pipeline is provided therein with a low pressure relief valve and a third stage pressure reducing valve.

The natural gas dewaxing vehicle provided by the present application may use the natural gas as fuel, which reduces the use cost. By employing the above fuel gas pressure reducing system, size of the vehicle will not be increased while ensuring the normal use of the natural gas, which reduces the cost and is suitable for modifying the existing vehicle.

As an improvement of the present application, a tail section of the low pressure pipeline is further connected to a combined solenoid valve assembly in series, the combined solenoid valve assembly includes an overpressure cut-off solenoid valve and a flow regulating solenoid valve connected in series. The first stage pressure reducing valve assembly includes two pressure reducing valves connected in parallel, and it is provided in series a cut-off valve upstream and downstream of each of the pressure reducing valves respectively. Along the flow direction of the fuel gas, the medium pressure pipeline upstream of the medium pressure relief valve is provided therein with a blow-off valve. The power device is an on-bedplate engine. The natural gas dewaxing vehicle further includes a control system provided on the bedplate, and the control system is connected to the natural gas combustion device, the water pump and the hot water device respectively. The blow-off valve is provided to facilitate the discharging of the routine residual fuel gas in the fuel gas pipeline after the pressure reducing.

The first stage pressure reducing valve assembly includes two pressure reducing valves connected in parallel, and it is provided a cut-off valve in series in the pipelines upstream and downstream of each of the pressure reducing valves, such that when one of the pressure reducing valves is adjusted, the other one of the pressure reducing valves may continue working.

As a further improvement of the present application, along the flow direction of the fuel gas, the high pressure pipeline downstream of the high pressure relief valve is further provided therein with a tee joint, and three gas ports of the tee joint are respectively connected to the gas storage device, the high pressure gas supply valve and a gas charging valve. A cut-off valve is connected between the gas charging valve and the tee joint in series. The high pressure pipeline between the tee joint and the high pressure gas supply valve is provided therein with a high pressure manometer. The high pressure pipeline between the high pressure gas supply valve and the heat exchanger is provided therein with a high pressure shut-off valve and a filter in series. The medium pressure pipeline between the medium pressure relief valve and the second stage pressure reducing valve is provided therein with a medium pressure manometer. The low pressure pipeline upstream of the low pressure relief valve is provided therein with a low pressure manometer. The low pressure pipeline between the low pressure relief valve and the third stage pressure reducing valve is provided therein with a low pressure gas supply valve and a flowmeter connected in series. The arrangement of the above devices is reasonable and compact thus the present application is suitable for using onboard.

As a further improvement of the present application, the hot water device is a heating furnace or a heater, the air blower is a centrifugal air blower, the gas storage device is a natural gas steel cylinder group. The natural gas steel cylinder group includes more than three natural gas steel cylinders which are connected via pipelines, a part of the natural gas steel cylinder group is provided on a top portion of the water tank, the other part of the natural gas steel cylinder group is provided on the bedplate behind the water tank.

The gas storage device is the natural gas steel cylinder group, the number of the natural gas steel cylinders may be increased or decreased according to different using needs, such that the natural gas dewaxing vehicle provided by the present application may applicable to various occasions having different gas consumptions.

As a further improvement of the present application, a carriage is provided in a region from a front end of the bedplate to a front portion of the water tank, a bottom portion of a front end of the carriage is fixedly connected to the bedplate, a bottom portion of a rear end of the carriage is fixedly connected to the top portion of the water tank. The carriage is provided to protect the devices, such as the on-bedplate engine, placed inside the carriage.

DETAILED DESCRIPTION OF THE INVENTION

Figure 1:
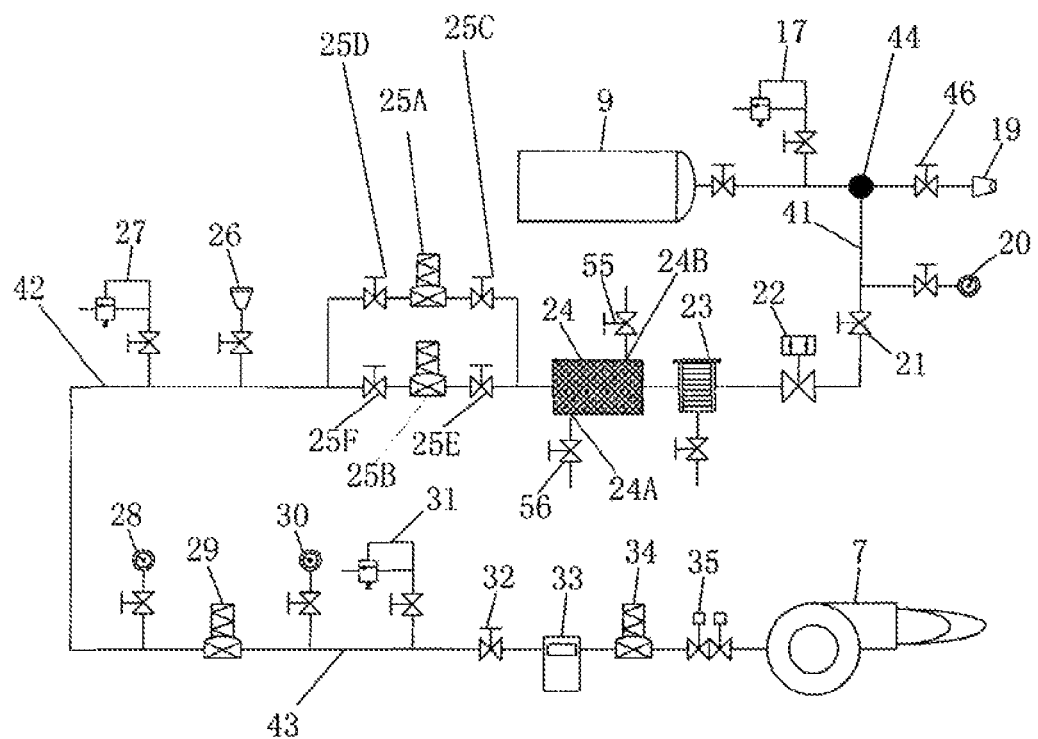
FIG. 1 is a schematic view of the structure of a fuel gas pressure reducing system provided by the present application.

As shown in FIG. 1, the fuel gas pressure reducing system provided by the present application includes a fuel gas pipeline having a predetermined length. Along a flow direction of fuel gas from a beginning end to a tail end, the fuel gas pipeline includes a high pressure pipeline 41, a medium pressure pipeline 42 and a low pressure pipeline 43. In use, a beginning end of the high pressure pipeline 41 is connected to an external gas storage device 9, and a tail end of the low pressure pipeline 43 is connected to an external combustion device 7.

Along the flow direction of fuel gas, the high pressure pipeline 41 is successively provided therein with a high pressure gas supply valve 21, a high pressure shut-off valve 22, a filter 23, a heat exchanger 24 and a first stage pressure reducing valve assembly, which are connected in series. A high pressure relief valve 17, a tee joint 44 and a high pressure manometer 20 are successively provided between the gas storage device 9 and the high pressure gas supply valve 21. Three gas ports of the tee joint 44 are respectively connected to the gas storage device 9, the high pressure gas supply valve 21 and a gas charging valve 19. A cut-off valve 46 is connected in series between the gas charging valve 19 and the tee joint 44. The gas charging valve 19 is provided to facilitate the charging of the natural gas into the gas storage device 9 via a gas charging station or via other ways when the fuel gas in the gas storage device 9 is consumed.

The first stage pressure reducing valve assembly includes two pressure reducing valves 25A and 25B provided in parallel. Cut-off valves 25C and 25D are respectively connected in series upstream and downstream of the pressure reducing valve 25A, and cut-off valves 25E and 25F are respectively connected in series upstream and downstream of the pressure reducing valve 25B. A hot fluid inlet 24A of the heat exchanger 24 is connected to an external hot water device, and a hot fluid outlet 24B of the heat exchanger 24 is connected to an external water storage device. The hot water device may be a heater (the heater may be a heater available from the market or a heater disclosed in the prior art), also may be a heating furnace which may be the heating furnace disclosed in a Chinese patent application No. 02208364.2 or other existing heating furnaces.

After passing through the first stage pressure reducing valve assembly, the pressure of the natural gas is reduced greatly, and the temperature of the pressure reduced fuel gas is lowered. The heat exchanger 24 is provided to heat the natural gas before reducing the pressure thereof so as to prevent the pressure reduced fuel gas from having a too low temperature. The cut-off valves 25C, 25D, 25E and 25F may cut off the gas lines passing through the first stage pressure reducing valve 25A or 25B so as to facilitate the routine adjustment or maintenance of the first stage pressure reducing valve assembly.

As shown in FIG. 1, along the flow direction of the fuel gas, the medium pressure pipeline 42 is provided therein with a blow-off valve 26 and a second stage pressure reducing valve 29 successively. Along the flow direction of the fuel gas, the medium pressure pipeline 42 between the blow-off valve 26 and the second stage pressure reducing valve 29 is provided therein with a medium pressure relief valve 27 and a medium pressure manometer 28 successively. The blow-off valve 26 is provided to facilitate the discharge of the routine residual fuel gas in the fuel gas pipeline after the pressure reducing.

As shown in FIG. 1, along the flow direction of the fuel gas, the low pressure pipeline 43 is successively provided therein with a low pressure gas supply valve 32, a flowmeter 33, a third stage pressure reducing valve 34 and a combined solenoid valve assembly 35 which are connected in series. The combined solenoid valve assembly may include an overpressure cut-off solenoid valve and a flow regulating solenoid valve provided in series. The fuel gas pipeline between the second stage pressure reducing valve 29 and the low pressure gas supply valve 32 is successively provided therein with a low pressure manometer 30 and a low pressure relief valve 31.

The high pressure relief valve 17, the medium pressure relief valve 27 and the low pressure relief valve 31 respectively provide overpressure protection to the high pressure pipeline 41, the medium pressure pipeline 42 and the low pressure pipeline 43. The high pressure manometer 20, the medium pressure manometer 28 and the low pressure manometer 30 are provided to facilitate monitoring the pressures in the high pressure pipeline 41, the medium pressure pipeline 42 and the low pressure pipeline 43 by the operator respectively.

In use, the fuel gas enters into the fuel gas pipeline from the gas storage device 9, passes through the high pressure gas supply valve 21, the high pressure shut-off valve 22 and the filter 23 successively and then enters into the heat exchanger 24 in which the fuel gas absorbs the heat of the hot fluid to reach a certain preheating temperature; and then the fuel gas enters into a proper pressure reducing valve in the first stage pressure reducing valve assembly, the second stage pressure reducing valve 29, the low pressure gas supply valve 32, the flowmeter 33, the third stage pressure reducing valve 34 and the combined solenoid valve assembly 35 successively to reduce its pressure. When meeting the safe combustion condition of the natural gas, the fuel gas is output and supplied to the combustion device 7.

Figure 2:
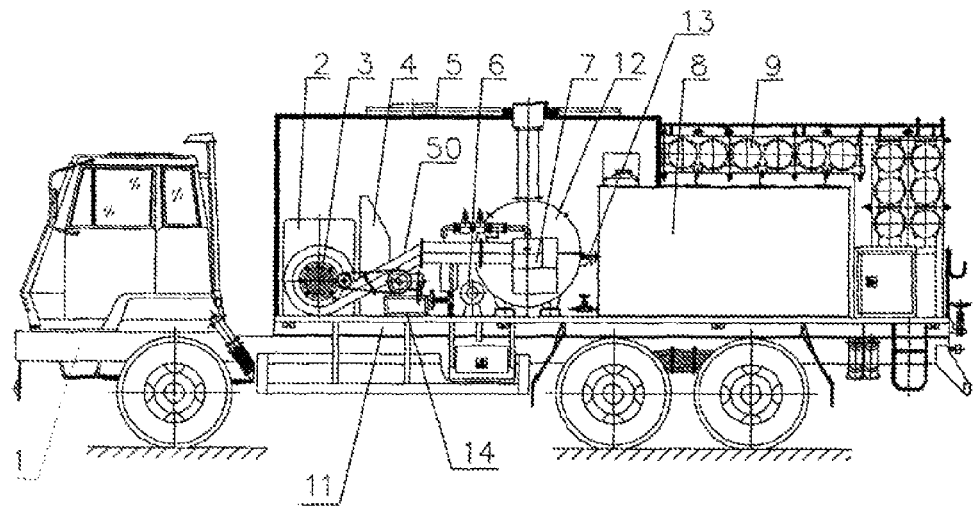
FIG. 2 is a schematic view of the structure of a natural gas dewaxing vehicle provided by the present application.
Figure 3:
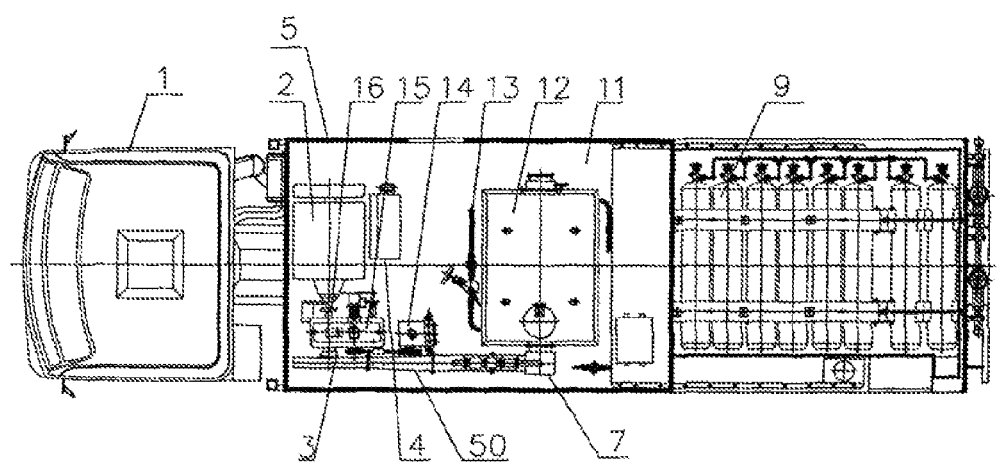
FIG. 3 is a top view of the natural gas dewaxing vehicle in FIG. 2.

As shown in FIGS. 2 and 3, a natural gas dewaxing vehicle provided by the present application includes a vehicle second-class chassis 1 and a bedplate 11 towed by the second-class chassis. A water supply system, a power mechanism, a combustion mechanism, the gas storage device 9 and a fuel gas pressure reducing system 6 connected to the gas storage device 9 are provided on the bedplate 11. The fuel gas pressure reducing system may be the fuel gas pressure reducing system described above.

As shown in FIGS. 1-3, along the flow direction of the water, the water supply system includes a water tank 8, a water pump 14, a hot water device 12 and the heat exchanger 24 in the above fuel gas pressure reducing system, which are successively connected circularly via a water pipeline system 13. Discharged water from the heat exchanger 24 flows back into the water tank 8.

As shown in FIGS. 2 and 3, the combustion mechanism includes an air blower 3 connected to a natural gas combustion device 7 via an air outlet pipe 50. The natural gas combustion device 7 is provided to heat the hot water device 12.

As shown in FIGS. 2 and 3, the power mechanism includes an on-bedplate engine 2 as the power device. The on-bedplate engine 2 is connected to the air blower 3 via a coupling 16 and provides power to the air blower 3, and the on-bedplate engine 2 is further connected to the water pump 14 via a driving and transmission case 15 and provides power to the water pump 14.

As shown in FIGS. 1-3, along the flow direction of the fuel gas, the gas supply system includes the gas storage device 9 and the fuel gas pressure reducing system 6. The fuel gas pressure reducing system 6 includes a fuel gas pipeline. Along the flow direction of the fuel gas, the fuel gas pipeline includes the high pressure pipeline 41, the medium pressure pipeline 42 and the low pressure pipeline 43 which are successively connected. A tail end of the low pressure pipeline 43 is connected to the natural gas combustion device 7, and a beginning end of the high pressure pipeline 41 is provided with the tee joint 44. One gas port of the tee joint 44 is connected with the gas charging valve 19, the other two gas ports of the tee joint 44 are respectively connected to the gas storage device 9 and the high pressure pipeline 41. A cut-off valve 46 is connected between the gas charging valve 19 and the tee joint 44 in series, and the connecting pipeline between the gas storage device 9 and the tee joint 44 is provided with a high pressure relief valve 17.

As shown in FIGS. 1-3, along the flow direction of the fuel gas, the high pressure pipeline 41 is successively provided therein with the high pressure gas supply valve 21, the high pressure shut-off valve 22, the filter 23, the heat exchanger 24 and the first stage pressure reducing valve assembly, which are connected in series. The high pressure pipeline 41 between the tee joint 44 and the high pressure gas supply valve 21 is provided therein with the high pressure manometer 20. The heat exchanger 24 is provided with the hot fluid inlet 24A and the hot fluid outlet 24B. The hot fluid inlet 24A is connected to the hot water device 12 via a cut-off valve 56, and the hot fluid outlet 24B is connected to the water tank 8 via a cut-off valve 55. The first stage pressure reducing valve assembly includes two pressure reducing valves 25A and 25B provided in parallel. Cut-off valves 25C and 25D are respectively connected in series upstream and downstream of the pressure reducing valve 25A, and cut-off valves 25E and 25F are respectively connected in series upstream and downstream of the pressure reducing valve 25B. The hot fluid inlet 24A and the hot fluid outlet 24B of the heat exchanger 24 are respectively connected to the water tank 8 and the hot water device 12. In use, the water may be circulated along the water tank 8, the hot water device 12, the heat exchanger 24 and the water tank 8.

As shown in FIG. 1, along the flow direction of the fuel gas, the medium pressure pipeline 42 is provided therein with the blow-off valve 26 and the second stage pressure reducing valve 29 successively. The medium pressure pipeline 42 between the blow-off valve 26 and the second stage pressure reducing valve 29 is provided therein with the medium pressure relief valve 27 and the medium pressure manometer 28 successively.

As shown in FIG. 1, along the flow direction of the fuel gas, the low pressure pipeline 43 is successively provided therein with the low pressure gas supply valve 32, the flowmeter 33, the third stage pressure reducing valve 34 and the combined solenoid valve assembly 35 which are connected in series. The fuel gas pipeline between the medium pressure relief valve 27 and the low pressure gas supply valve 32 is provided therein with the low pressure manometer 30 and the low pressure relief valve 31 successively. As shown in FIGS. 1-3, an outlet of the combined solenoid valve assembly 35, acted as the tail end of the low pressure pipeline 43, is connected to the natural gas combustion device 7.

As shown in FIGS. 2 and 3, the natural gas dewaxing vehicle provided by the present application further includes a control system provided on the bedplate 11. The control system is connected to the natural gas combustion device 7, the water pump 14 and the hot water device 12, respectively, so as to realize the control of the operating process thereof.

As shown in FIGS. 2 and 3, the water tank 8 is provided on the middle-rear portion of the bedplate 11. The natural gas combustion device 7 and the hot water device 12 are provided on the middle portion of the bedplate 11 and are provided adjacent to the water tank 8. The power mechanism and the air blower 3 of the combustion mechanism are provided on the front portion of the bedplate 11. The control system is provided on the bedplate 11 between the power mechanism and the hot water device 12.

As shown in FIGS. 2 and 3, a carriage 5 is provided in a region from a front end of the bedplate 11 to a front portion of the water tank 8. A bottom portion of a front end of the carriage 5 is fixedly connected to the bedplate 11, and a bottom portion of a rear end of the carriage 5 is fixedly connected to the top portion of the water tank 8.

The hot water device 12 may be a heating furnace, also may be a heater. The air blower 3 may be a centrifugal air blower 3, also may be other kinds of air blower 3. As shown in FIGS. 2 and 3, in the natural gas dewaxing vehicle provided by the present application, a natural gas steel cylinder group includes twelve natural gas steel cylinders, which are connected via pipelines. A part of the natural gas steel cylinder group is provided on a top portion of the water tank 8, the other part of the natural gas steel cylinder group is provided on the bedplate 11 behind the water tank 8. The gas storage device 9 is not limited to be the natural gas steel cylinder group, also may be other natural gas storage devices.

In dewaxing operation, the compressed natural gas in the gas storage device 9 enters into the fuel gas pressure reducing system 6 to reduce its pressure. When the pressure reduced natural gas reaches the predetermined combustion condition, the on-bedplate engine 2 is started to drive the water pump 14 to supply operation medium (water) to the hot water device 12. When the hot water device 12 is filled with the operation medium (water), the control system 4 is started such that the natural gas combustion device 7 heats the operation medium (water) to high temperature vapor or hot water according to a set program, thereby performing dewaxing operation to the wax precipitation in the oil pipe, the oil rod and the oil pipeline.

What is claimed is:

1. A fuel gas pressure reducing system comprising a fuel gas pipeline,
wherein along a flow direction of fuel gas, the fuel gas pipeline comprises a high pressure pipeline, a medium pressure pipeline and a low pressure pipeline which are successively connected,
wherein the high pressure pipeline is provided with a high pressure gas supply valve and a first stage pressure reducing valve assembly, and the first stage pressure reducing valve assembly comprises two pressure reducing valves connected in parallel, wherein a cut-off valve is provided upstream and downstream of each of the pressure reducing valve, respectively, and a beginning end of the high pressure pipeline is connected to a gas storage device;
wherein the medium pressure pipeline is provided with a second stage pressure reducing valve; and
wherein the low pressure pipeline is provided with a third stage pressure reducing valve;
wherein the high pressure pipeline is further provided with a heat exchanger, the heat exchanger is located upstream of the first stage pressure reducing valve assembly;
wherein the high pressure pipeline is further provided with a high pressure relief valve, the medium pressure pipeline is further provided with a medium pressure relief valve, and the low pressure pipeline is further provided with a low pressure relief valve; and
wherein along the flow direction of the fuel gas, the high pressure pipeline downstream of the high pressure relief valve is provided with a tee joint, three gas ports of the tee joint are respectively connected to the gas storage device, the high pressure gas supply valve and a gas charging valve, a cut-off valve is connected between the gas charging valve and the tee joint in series; the high pressure pipeline between the tee joint and the high pressure gas supply valve is provided with a high pressure manometer; the high pressure pipeline between the high pressure gas supply valve and the heat exchanger is provided with a high pressure shut-off valve and a filter connected in series; the medium pressure pipeline between the medium pressure relief valve and the second stage pressure reducing valve is provided with a medium pressure manometer; the low pressure pipeline upstream of the low pressure relief valve is provided with a low pressure manometer; the low pressure pipeline between the low pressure relief valve and the third stage pressure reducing valve is provided with a low pressure gas supply valve and a flowmeter connected in series.

2. The fuel gas pressure reducing system according to claim 1, wherein a tail section of the low pressure pipeline is further connected to a combined solenoid valve assembly in series, the combined solenoid valve assembly comprises an overpressure cut-off solenoid valve and a flow regulating solenoid valve connected in series.

3. A natural gas dewaxing vehicle comprising a vehicle chassis provided thereon with a bedplate on which a water supply system, a power mechanism, a combustion mechanism, a gas storage device and a fuel gas pressure reducing system connected to the gas storage device are provided; wherein along a flow direction of water, the water supply system comprises a water tank, a water pump, a hot water device and a heat exchanger which are successively connected via a water pipeline system, and discharged water from the heat exchanger flows back into the water tank; wherein the combustion mechanism comprises an air blower connected to a natural gas combustion device via an air outlet pipe, the natural gas combustion device is provided to heat the hot water device;
wherein the power mechanism comprises a power device which is connected to the air blower and the water pump and provides power to the air blower and the water pump;
wherein along a flow direction of natural gas, a gas supply system comprises the gas storage device and the fuel gas pressure reducing system;
wherein the fuel gas pressure reducing system is the fuel gas pressure reducing system according to claim 1, a tail end of the low pressure pipeline is connected to the natural gas combustion device, a beginning end of the high pressure pipeline is connected to the gas storage device; a hot fluid inlet of the heat exchanger is connected to the hot water device, a hot fluid outlet of the heat exchanger is connected to the water tank;
wherein the power device is an on-bedplate engine; and
wherein the natural gas dewaxing vehicle further comprises a control system provided on the bedplate, the control system is connected to the natural gas combustion device, the water pump and the hot water device, respectively.

4. The natural gas dewaxing vehicle according to claim 3, wherein the hot water device is a heating furnace or a heater, the air blower is a centrifugal air blower, the gas storage device is a natural gas steel cylinder group, the natural gas steel cylinder group comprises more than three natural gas steel cylinders which are connected via pipelines, a part of the natural gas steel cylinder group is provided on a top portion of the water tank, the other part of the natural gas steel cylinder group is provided on the bedplate behind the water tank.

5. The natural gas dewaxing vehicle according to claim 4, wherein a carriage is provided in a region from a front end of the bedplate to a front portion of the water tank, a bottom portion of a front end of the carriage is fixedly connected to the bedplate, a bottom portion of a rear end of the carriage is fixedly connected to the top portion of the water tank.

6. The natural gas dewaxing vehicle according to claim 3, wherein the high pressure pipeline is further provided with a high pressure relief valve, the medium pressure pipeline is further provided with a medium pressure relief valve, and the low pressure pipeline is further provided with a low pressure relief valve.

7. The natural gas dewaxing vehicle according to claim 6, wherein a tail section of the low pressure pipeline is further connected to a combined solenoid valve assembly in series, the combined solenoid valve assembly comprises an overpressure cut-off solenoid valve and a flow regulating solenoid valve connected in series.

* * * * *